Patented Aug. 6, 1946

2,405,451

UNITED STATES PATENT OFFICE 2,405,451

PROCESS FOR PRODUCING LOW MOLECULAR WEIGHT LIGNIN DEGRADATION PRODUCTS

Jörgen Richter Salvesen, Ralph L. Hossfeld, and Robert J. Lovin, Wausau, Wis., assignors to Marathon Corporation, a corporation of Wisconsin No Drawing. Application January 22, 1945, Serial No. 574,024

9 Claims. (Cl. 260—124)

This invention is concerned with a process in which lignin compounds are treated at elevated temperatures and pressures in admixture with an aqueous sodium alkaline solution, and a secondary alcohol.

It has been discovered that such a process, when carried out under conditions which we will describe herein, will give high yields of low molecular weight lignin degradation products which consist in part of compounds of the general type of guaiacol, and catechol, and certain of their homologues, as well as certain neutral compounds.

We have conducted numerous experiments according to the methods of our process in which different primary, secondary and tertiary alcohols were employed, and these experiments have shown that only the primary and secondary alcohols are effective in producing the desired high yields of low molecular weight degradation products. The tertiary alcohol gives substantially lower yields of the lignin degradation products, the yields being of the same order of magnitude as those obtained in comparable experiments where the alcohol was omitted as a control measure.

When primary alcohols are employed in our process as disclosed in our copending application Serial No. 520,668 we have found that substantially higher yields of low molecular weight lignin degradation products are obtained than have been previously disclosed in the literature for other lignin degradation processes. However, a considerable amount of the primary alcohol is lost for further use in the process through intermolcuelar condensation of the alcohol with itself, to form higher alcohols, and through conversion to the corresponding carboxylic acid.

When secondary alcohols are employed in our process under conditions similar to those in which primary alcohols were used, the yields of low molecular weight lignin degradation products are equally large. However, contrary to expectations, only comparatively small amounts of the secondary alcohol are lost through conversion to higher alcohols by intermolecular condensation, and only very small quantities are converted to carboxylic acids. The absence of these alcohol by-products greatly facilitates subsequent recovery of the lignin degradation products and, in addition, an economic advantage is obtained through a decrease in the amount of alcohol consumed in the process. In the carrying out of our process, we have found that either batch or continuous flow equipment may be used provided such equipment is designed to operate safely in the pressure range of 200-250 atmospheres. In the first case suitable quantities of the lignin product to be degraded are mixed with the sodium alkaline solution and the secondary alcohol and the resulting mixture placed in a high pressure bomb where it is heated with agitation. In the latter case, the mixture of lignin product, sodium alkaline solution and secondary alcohol is continuously pumped through suitable high pressure heat exchangers into a high pressure, holding vessel where the reaction is allowed to take place. The reacted mixture is then continuously removed from the system through a suitable cooler and throttling valve. The reacted mixture is then acidified whereupon the lignin degradation products and the unconsumed secondary alcohol are caused to separate from the aqueous portion of the mixture and are recovered. The recovered mixture of the organic products are further separated in the usual manner into acidic, phenolic and neutral fractions. These fractions are then further separated by well known methods into their individual components. For example, we have fractionally distilled the phenolic fraction to obtain catechol, p-methyl catechol, guaiacol, and p-methyl guaiacol.

Any suitable available lignin materials can be utilized in carrying out our process. The concentration of sodium alkalinity may be varied depending on the type of lignin compound employed. However, we have found that most satisfactory results are obtained if sufficient alkali is used so that the final pH of the heated mixture is not substantially less than 10.

The temperature of operation of our process may be varied within the range of 250° to 350° C. However, we have found temperatures in the vicinity of 300° C. to be optimum for maximum production of lignin degradation products of the type of pyrocatechol and its homologues.

The time of processing may be varied in the range of ½ to 6 hours, the yield of degradation, in general, increasing with time. However, we have found that a time of heating of two hours gives good yields of the desired lignin degradation products.

The quantity of alcohol to be employed in the mixture has been studied in the range from about 10% to 100% of the volume of the sodium alkaline lignin solution. It has been found that quantities in the range of 25% to 100% of the sodium alkaline solution are most useful, and that an amount equal to about 65% of the sodium alkaline lignin solution gives optimum yields of catechol type material under the conditions of the following examples. It has also been found that although a relatively large proportion of alcohol is used to give the optimum yield of lignin degradation products, it is possible to recover in the neighborhood of 90–95% of the alcohol for re-use in the process.

*Example 1*

600 ml. of an aqueous solution containing 93 gm. of lignin in the form of a sodium lignosulfonate, and 84 gm. of sodium hydroxide, were mixed with 400 ml. of secondary butyl alcohol and the mixture placed in a high pressure bomb. The mixture was heated with agitation, at a temperature of 300° C., for a period of two hours. The cooled reaction mixture was then neutralized with dilute sulfuric acid whereupon the mixture separates into two phases, the upper layer being an alcoholic solution of the lignin degradation products and the lower an aqueous layer. The upper layer containing the lignin degradation products was separated and combined with the secondary butanol washings of the lower aqueous layer. This butanol solution of degradation products may be treated in known ways to obtain the various compounds which it contains. It has been found suitable to first neutralize the excess mineral acid acidity by treating with an aqueous suspension of calcium carbonate, then to distill off essentially all the excess alcohol, then to pour the residue in a fine stream into a large excess of an aliphatic hydrocarbon solvent with vigorous stirring. Through such a procedure, a flocculent precipitate of partially degraded but amorphous and non-distillable lignin material separates, leaving a solution of the low molecular weight, distillable lignin degradation products. The low molecular weight products may then be individually segregated in known ways.

The yields by weight of lignin degradation products so obtained were as follows:

|  | Per cent based on original lignin |
|---|---|
| Catechols | 38 |
| Monohydric phenols | 5.4 |
| Neutral material | 14.1 |

*Example 2*

600 ml. of a solution containing 93 gm. of lignin in the form of a sodium lignin sulfonate, and 84 gm. of sodium hydroxide, were mixed with 400 ml. of secondary butyl alcohol and the mixture placed in a high pressure bomb. The mixture was heated with agitation, at a temperature of 350° C., for a period of two hours. The cooled reaction mixture was then treated as outlined in Example 1 to give the following yields by weight of lignin degradation products:

|  | Per cent based on original lignin |
|---|---|
| Catechols | 14.5 |
| Monohydric phenols | 21.8 |
| Neutral material | 34.9 |

*Example 3*

600 ml. of a solution containing 93 gm. of lignin in the form of a sodium lignosulfonate, and 84 gm. of sodium hydroxide, were mixed with 400 ml. of isopropyl alcohol and placed in a high pressure bomb. The mixture was heated with agitation, at a temperature of 325° C., for a period of two hours. The cooled reaction mixture was then distilled to remove the unused isopropyl alcohol, the distillation being preferably carried out under slight vacuum. The residue from this distillation was then treated as outlined in Example 1, with the exception that normal butyl was used in place of secondary butyl alcohol in the extraction of the aqueous phase because of its greater insolubility in the water.

The yields by weight of lignin degradation products obtained were as follows:

|  | Per cent based on original lignin |
|---|---|
| Catechols | 17.8 |
| Monohydric phenols | 23.9 |
| Neutral material | 39.2 |

*Example 4*

600 ml. of a solution containing 93 gm. of lignin in the form of sodium lignosulfonate, and 84 gm. of sodium hydroxide, were mixed with 400 ml. of isopropyl alcohol, and the mixture placed in a high pressure bomb. The mixture was heated with agitation, at a temperature of 270° C., for a period of two hours. The cooled reaction mixture was then treated as outlined in Example 3 to give the following yields by weight of lignin degradation products:

|  | Per cent based on original lignin |
|---|---|
| Catechols | 32.6 |
| Monohydric phenols | 4.3 |
| Neutral material | 5.4 |

The foregoing examples are given as illustrations of various typical applications for our invention. It should be understood that numerous other variations and modifications are possible within the scope and principles of the invention herein disclosed as defined in the appended claims.

We claim:

1. A process for making low molecular weight distillable organic compounds from lignin substance which comprises treating a lignin substance with a mixture of water, sodium alkaline solution, and a secondary aliphatic alcohol at 250° to 350° C.

2. A process for making low molecular weight distillable organic compounds from lignin substances which comprises treating a lignin substance with a mixture of water, sodium alkaline solution, and a secondary aliphatic alcohol in amounts of from 25 to 75% of the volume of the total mixture at 250° to 350° C., and recovering the low molecular weight compounds from the reaction mixture.

3. A process for making low molecular weight simple distillable organic compounds from lignin substances which comprises treating a lignin substance with a mixture of water, sodium alkaline solution, and secondary butyl alcohol, at 250° to 350° C., and recovering the low molecular weight compounds from the reaction mixture.

4. A process for making low molecular weight simple distillable organic compounds from lignin substances which comprises treating a lignosulfonic acid compound with a mixture of water, sodium alkaline solution, and secondary butyl alcohol, at 250° to 350° C., and recovering the low molecular weight compounds from the reaction mixture.

5. A process for making low molecular weight simple distillable organic compounds from lignin substances which comprises treating a lignin substance with a mixture of water, sodium alkaline solution and a secondary aliphatic alcohol, at 250° to 350° C. for a period of about ½ to 2 hours and recovering the low molecular weight compounds from the reaction mixture.

6. A process for making low molecular weight simple distillable organic compounds from lignin substances which comprises treating a lignin substance with a mixture of water, sodium alkaline solution, and a secondary aliphatic alcohol, in a temperature range from 250° to 350° C. and recovering the low molecular weight compounds from the reaction mixture.

7. A process for making low molecular weight simple distillable organic compounds from lignin substances which comprises treating lignosulfonic acid compounds with a mixture of water, sodium alkaline solution, and a lower secondary aliphatic alcohol, for a period of from ½ to 2 hours in the temperature range from 250° C. to 350° C., and recovering the low molecular weight compounds from the reaction mixture.

8. A process for making low molecular weight simple distillable organic compounds from lignin substances which comprises treating lignosulfonic acid compounds with a mixture of water, sodium alkaline solution, and secondary butyl alcohol, for a period of from ½ to 2 hours in the temperature range of from 250° to 350° C., and recovering the low molecular weight compounds from the reaction mixture.

9. A process for making low molecular weight simple distillable organic compounds from lignin substances which comprises treating lignosulfonic acid compounds with a mixture of water, sodium alkaline solution, and isopropyl alcohol, for a period of from ½ to 2 hours in the temperature range of from 250° to 350° C., and recovering the low molecular weight compounds from the reaction mixture.

JÖRGEN RICHTER SALVESEN.
RALPH L. HOSSFELD.
ROBERT J. LOVIN.